Dec. 10, 1968    R. J. BONCUK ET AL    3,416,078
METHOD OF DETERMINING RESISTIVITY OF A THIN LAYER
Filed July 8, 1965

INVENTORS
Richard J. Boncuk
Albert E. Ozias, Jr.

BY

ATTYS.

United States Patent Office

3,416,078
Patented Dec. 10, 1968

---

3,416,078
METHOD OF DETERMINING RESISTIVITY OF A THIN LAYER
Richard J. Boncuk, Scottsdale, and Albert E. Ozias, Jr., Tempe, Ariz., assignors to Motorola, Inc., Franklin Park, Ill., a corporation of Illinois
Filed July 8, 1965, Ser. No. 470,377
11 Claims. (Cl. 324—64)

---

ABSTRACT OF THE DISCLOSURE

A method of determining the resistivity of a thin layer of electrically conductive material which includes applying a wide area ohmic contact directly to the thin area and in physical contact therewith. Next, a conductive circuit including the thin layer and the contact is completed in order to apply a current of known value to the contact. By measuring the induced voltage drop across the thin layer, the resistivity thereof can be determined.

---

Figure 1:
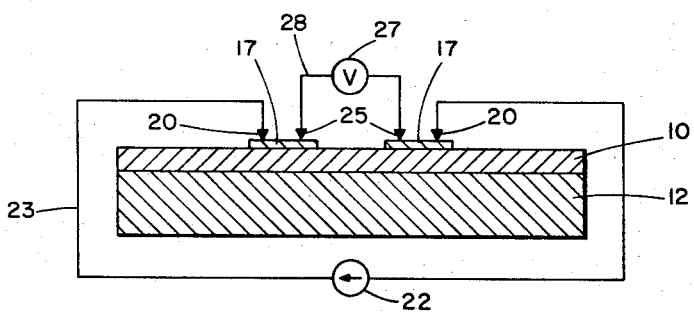

This invention relates to a method of determining the resistivity of electrically conductive thin layers on electrically conductive materials or substrates and more particularly to electrically conductive thin layers on semiconductor materials.

The term electrically conductive materials is intended to include the many elements and compounds which are capable of the transmission of electricity. These elements and compounds are commonly classed in the two broad categories of conductors, such as copper and aluminum, and semiconductors, such as silicon and germanium.

In the field of semiconductor devices there is a desire to build units as small as possible. This miniaturization is limited by available production techniques and methods by evaluating the products during the various steps of manufacturing. One of the production techniques which has aided this trend toward smaller devices is the well known epitaxial process which allows the depositing of a thin layer of closely controlled thickness and resistivity. In the evaluation of this thin layer many methods have been available for determining the thickness rapidly and accurately but, there has not been a suitable method of accurately determining the resistivity of multilayer semiconductor materials of the same conductivity type.

The resistivity of a semiconductor material is commonly measured in ohm-centimeters. The resistivity is directly related to the concentration of impurities in the semiconductor material, and therefore the ascertainment of the resistivity is important in the determination of the processing steps required for the semiconductor material so that devices of desired specifications may be produced.

The four-point probe, which is commonly used to measure the resistivity of semiconductor materials, does not provide accuracy in the measurement of the resistivity of thin layers deposited on substrates of similar conductivity type because the spreading resistance effect requires the probes to be placed impractically close together, on the order of the thin layer thickness apart or less, and the tendency of the low resistivity substrate to act as a short.

The three-point probe method relies on the breakdown voltage characteristics of the material at one of the probe contact points to yield a figure which may be used to calculate the resistivity. This three-point probe method requires skilled judgment as to when the breakdown occurs and the results are only approximations of the actual resistivity.

The resistivity may also be determined by the measurement of the breakdown voltage of a diode formed on the thin layer and the indirect calculation from the measured breakdown voltage of the resistivity. Another method is to calculate the resistivity from the measured capacitance of a diode formed on the thin layer. These methods yield only indirectly calculated approximations of the resistivity and therefore include considerable possibility of error being introduced into the process.

It is an object of this invention to provide a method of accurately determining the resistivity of a thin layer on an electrically conductive material.

It is another object of the invention to provide a rapid and reproducible method of determining the resistivity of a thin layer on a surface of an electrically conductive material.

A further object of this invention is to provide a method of determining the resistivity of a thin layer on an electrically conductive material wherein the preparation of the material is relatively simple.

A still further object of this invention is to provide a method of determining the resistivity of a thin layer deposited on a semiconductor material of similar conductivity type.

A feature of this invention is a novel method of determining the resistivity of a thin layer on a substrate which utilizes area contacts of a very low resistance, commonly called ohmic contacts, formed on the surface of the thin layer and the substrate.

Another feature of this invention is a method of determining the resistivity of a thin layer on a substrate in which the ohmic contacts used are of sufficient area that the spreading resistance effect is a negligible factor in the determination of the resistivity.

A further feature of this invention is a method of determining the resistivity of a thin layer on a substrate in which independent circuit loops are used for applying a current and measuring the induced voltage drop.

Figure 2:
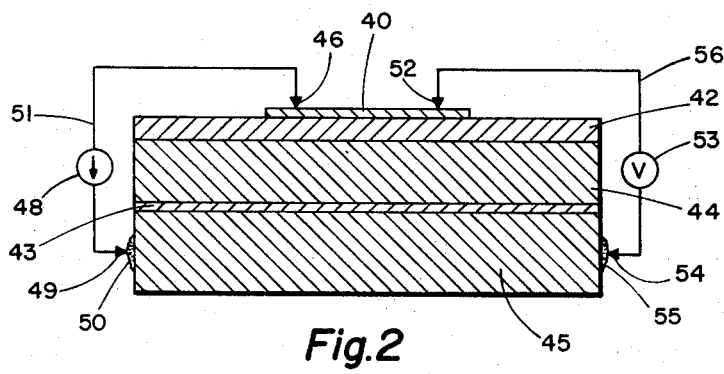

In the accompanying drawing:
FIG. 1 is a schematic view showing an arrangement for making measurements to determine resistivity according to the present invention; and
FIG. 2 is a schematic view showing an arrangement for making measurements to determine resistivity according to a second embodiment of the present invention.

The determination of the resistivity of a thin layer on a substrate, in accordance with this invention, includes the forming of spaced ohmic contacts on the thin layer and the substrate with at least one of the contacts being on the thin layer and the contacts having an area significantly larger than a point contact. A substantially constant current of known value is applied to the contacts and the inducted voltage drop is measured. The voltage drop measured together with the known current, the contact areas and the layer thickness enables determination of the resistivity of the thin layer.

In accordance with this invention, accurate and reproducible determination of resistivity is obtainable for thin layers over a broad range of resistivity values, with values, depending upon the resistivity of the substrate, as low as about 0.05 ohm-centimeters and an apparently unlimited upper value. The normal range of resistivities measured is approximately 0.3 to 150 ohm-centimeters. Accurate measurements using the method of the invention are achieved when the substrate upon which the thin layer is deposited advantageously has a lower resistivity than the thin layer and is of similar conductivity type.

The thin layers which may be measured to determine the resistivity may be formed by one of the well known processes such as the epitaxial process which are used to form thin layers, e.g., thicknesses in the range between about ½ micron or less to 100 microns or more. The determination of the resistivity according to this invention advantageously is used for thin layer thicknesses of about 5 microns to 50 microns although this method may be used on thicker material when a suitable conductive backing is supplied.

The method of determining the resistivity according to this invention includes the measurement of the induced voltage drop that results when a constant current is passed through the thin layer. The voltage drop that normally results from contact resistance is minimized by the use of a high impedance voltmeter having a minimum input impedance of about 1 megohm and by the formation of large ohmic contacts, of a size significantly larger than a point contact, on the surface of the thin layer and the substrate. A high impedance voltmeter utilizes a negligible portion of the current in a circuit and thereby yields reliable measurements while exerting an insignificant effect.

The ohmic contacts used may be formed by any of the many methods well known in the semiconductor art. A preferred method, is the evaporation of a compatible metal onto the thin layer and the substrate and a subsequent alloying of the metal with the thin layer and the substrate.

Advantageously, the contacts should be of an area greater than the square of the thickness of the thin layer to be measured; however, it is preferred to have the size of these contacts somewhat larger than this minimum size, at least an order of magnitude. These contacts may be circular, rectangular, or any other geometrical shape which produces a compact contact and is conveniently formed. The use of contacts of this size reduces the voltage drop resulting from the spreading resistance effect to a negligible amount.

The contacts used for measuring resistivity according to this invention advantageously are spaced at least 8 mils and preferably spaced between about 8 and 50 mils with the minimum distance determined by the capabilities of the facilities to form the contacts and the upper limit being determined by the resistivities and the thicknesses of the thin layer and the substrate.

The substantially constant current that is applied to these contacts may vary over a broad range, for example, from about 0.1 to 30 amps per square centimeter. The maximum current is limited to an extent by the size of the contacts and the point where the material breaks down. The use of current densities below about 1 amp per square centimeter has yielded accurate resistivity determinations on a wide range of thin layers.

The following explanation of the determination of the resistivity of semiconductor material in accordance with this invention will be described with reference to the accompanying drawing. In FIG. 1, which shows one embodiment of this invention, an epitaxial layer 10 of P doped silicon, about 11 microns thick, was deposited on a P+ doped silicon substrate 12. Two contacts 17 of aluminum were deposited by evaporation on the surface of the epitaxial layer 10 and alloyed to the epitaxial layer 10 by heating. A very low resistance contact, commonly called an ohmic contact, was obtained on the surface of the material to be measured by this metal alloying process. The method of forming this metal alloy may be one of the many processes well known in the semiconductor art. When the size of the contact area is selected as previously described the spreading resistance effect is a negligible portion of the measured voltage drop. In this embodiment, the contacts 17 were each about $15.6 \times 10^{-4}$ square centimeters and about 8 mils apart.

Probes 20 from a constant current source 22 were connected to each of the contacts 17 on the epitaxial layer 10 and a constant current of known value was passed through current circuit loop 23. A current density of 0.577 amp per square centimeter was applied to the contacts 17 in this embodiment.

Probes 25 from a high impedance voltmeter 27 with an input impedance of $10^{10}$ megohms were connected through a voltmeter circuit loop 28, which was separate from the current circuit loop 23, to the contacts 17 and the reading of the voltmeter 27, in conjunction with the other known values, was substituted into the formula $$r = \frac{VA}{I \times 2 \times L}$$

to calculate the resistivity directly. In this expression, $r$ is the resistivity, $V$ is the measured voltage, $I$ is the substantially constant current, $A$ is the area of one contact on the thin layer or an average of the areas of the two contacts if they are unequal, and $L$ is the epitaxial layer thickness.

The thickness of the epitaxial layer 10 was determined by a Beckman CsBr–IR–5A instrument using infra-red light reflection although any of the other methods well known to the art, such as bevel and stain or weight differential, may be used to determine this layer thickness.

In the above embodiment it is believed that the current flows through the epitaxial layer 10 in effectively straight lines to the substrate. Therefore, the resistance which causes the voltage drop bears a direct relationship to the area of the contacts 17 and the thickness of the epitaxial layer 10. The voltage drop in the substrate 12 may be disregarded because the resistance of this material is negligible compared to the epitaxial layer 10.

In another embodiment of this invention, FIG. 2, a single aluminum ohmic contact 40, of known area, was deposited on an epitaxial layer 42 and a low resistance backing 43 of gold gallium was evaporated and alloyed on the opposite side of the substrate 44. The substrate 44 was placed on a copper vacuum chuck 45 so that the gold gallium backing 43 was in intimate ohmic electrical contact with the chuck 45. The probe 46 from a constant current source 48 which has one lead 49 connected by solder 50 to the copper chuck 45 to form a current circuit loop 51, was connected to the contact 40 and a constant current of known value was passed through the loop 51. The probe 52 from a high impedance voltmeter 53 having an input impedance of 10 megohms which had one lead 54 connected by solder 55 to the copper chuck 45 to form a voltmeter circuit loop 56 separate from the current circuit loop 51, was connected to the contact 40 and the induced voltage drop was measured. The reading from the voltmeter 53, in conjunction with the other known values, was substituted into the formula $$r = \frac{VA}{IL}$$

to calculate the resistivity directly, the symbols being as defined above.

In this embodiment it is believed that the current flows through the epitaxial layer in effectively straight lines and therefore the formula for the calculation of the resistivity has been adjusted to reflect the voltage drop caused by the single passage of current through the epitaxial layer. The voltage drop in the substrate may be disregarded because the resistance of the subtrate is negligible when compared to the epitaxial layer.

This invention thus provides a simpler and more accurate method of determining the resistivity of thin layers on substrates, especially of thin layers on semi-conductor materials, than was previously available.

We claim:

1. A method of determining the resistivity of a thin layer of semiconductor material of relatively high resistivity and formed on a substrate of relatively low resistivity including the steps of: applying an ohmic contact to said thin layer, said contact being in direct physical contact with the thin layer and having an area significantly greater than a point contact, completing a conductive circuit which includes said contact, said thin layer and said substrate, applying a current of known value through said conductive circuit, thereby passing said current through said conductive circuit and measuring the induced voltage drop across said thin layer in order to determine the resistivity thereof.

2. The method defined in claim 1 wherein said contact is formed by evaporating a metal on said thin layer.

3. The method defined in claim 1 wherein said contact has an area greater than the square of the thin layer thickness.

4. The method defined in claim 1 wherein the step of completing a conductive circuit includes applying another contact to the surface of said thin layer and spaced apart from said first applied contact, and measuring the induced voltage drop in the thin conductive layer beneath the contacts.

5. The method defined in claim 4 which includes spacing said another contact approximately 8 mils apart from the first formed contact and passing a current having a density of between approximately 0.1 and 30 amperes per square centimeter through the conductive thin layer and between the contacts.

6. A method of determining the resistivity of a thin layer of semiconductor material of relatively high resistivity and formed on a substrate of relatively low resistivity which includes the steps of forming an ohmic contact directly on the thin layer and in physical and electrical contact therewith, forming a conductive path which includes said contact, said thin layer and said substrate and which is adapted to receive an energizing potential for passing current through said conductive path, and applying a current of known value through said conductive path so that said current passes through said conductive path and measuring the induced voltage drop across the thin layer in order to determine the resistivity thereof.

7. The method defined in claim 6 which further includes forming a layer of gold gallium on the surface of the substrate opposite to that surface upon which the thin semi-conductor layer is formed, attaching a copper vacuum chuck to the layer of gold gallium, said current being passed through said thin layer, through said substrate, through said layer of gold gallium and to said copper vacuum chuck, and measuring the induced voltage drop between said copper chuck and said ohmic contact on said thin layer to thereby determine the resistivity of said thin layer.

8. The method defined in claim 6 wherein the step of forming a conductive path includes forming another ohmic contact on the surface of said thin layer and spaced apart from the first formed ohmic contact, said current being passed between said ohmic contacts and through said thin layer beneath the contacts, and measuring the induced voltage drop across the thin layer beneath the contacts in order to determine the resistivity of the thin layer.

9. The method defined in claim 8 wherein both contacts on the surface of said thin layer are formed with an area greater than the square of the thin layer thickness, and said contacts on the thin layer are spaced apart between approximately 8 mils and 50 mils on the thin layer.

10. The method defined in claim 9 which includes passing a current having a density between approximately 0.1 and 30 amperes per square centimeter through said thin layer.

11. A method of determining the resistivity of a thin layer of semiconductor material of relatively high resistivity and formed on a substrate of relatively low resistivity which includes the steps of forming an ohmic contact directly on the thin layer and in physical and electrical contact therewith, forming a layer of gold gallium on the surface of the substrate opposite to the surface upon which the thin semiconductor is formed, attaching a copper vacuum chuck to the layer of gold gallium, passing a current between said contact and said copper chuck, and measuring the induced voltage drop between said ohmic contact and said copper chuck to thereby determine the resistivity of said thin layer.

References Cited

UNITED STATES PATENTS

| 2,921,257 | 1/1960 | Boicey | 324—65 |
| 2,142,619 | 1/1939 | Sciaky | 324—64 |
| 3,287,637 | 11/1966 | Keller | 324—61 XR |

OTHER REFERENCES

Kovacs et al., "Determination of Impurity Distribution Profiles in Silicon Epitaxial Wafers," SCP and Solid State Technology, August 1964, pp. 32–36.

"Semiconductor Resistivity Test Set," Baird Associates Inc., Technical Bulletin TP–10, February 1956, 4 pages.

RUDOLPH V. ROLINEC, *Primary Examiner.*

E. E. KUBASIEWICZ, *Assistant Examiner.*